Oct. 13, 1942.　　　O. M. BUNDY　　　2,299,007
CONTROL SYSTEM FOR CYCLICALLY OPERATING MACHINES
Filed March 22, 1940　　　4 Sheets-Sheet 1

INVENTOR.
Oswald M. Bundy
Harry P. Canfield
BY
ATTORNEY.

Oct. 13, 1942. O. M. BUNDY 2,299,007

CONTROL SYSTEM FOR CYCLICALLY OPERATING MACHINES

Filed March 22, 1940 4 Sheets-Sheet 2

INVENTOR.
Oswald M. Bundy
Harry P. Canfield
BY ATTORNEY.

INVENTOR.
Oswald M. Bundy
Harry R. Canfield
BY
ATTORNEY.

Oct. 13, 1942.   O. M. BUNDY   2,299,007
CONTROL SYSTEM FOR CYCLICALLY OPERATING MACHINES
Filed March 22, 1940   4 Sheets-Sheet 4

INVENTOR.
Oswald M. Bundy
BY Harry R. Canfield
ATTORNEY.

Patented Oct. 13, 1942

2,299,007

UNITED STATES PATENT OFFICE 2,299,007

CONTROL SYSTEM FOR CYCLICALLY OPERATING MACHINES

Oswald M. Bundy, Cleveland Heights, Ohio, assignor to The Clark Controller Company, Cleveland, Ohio, a corporation of Ohio Application March 22, 1940, Serial No. 325,481

10 Claims. (Cl. 175—335)

This invention relates to electrical control systems for machinery of the class in which a cycle of movements is performed, for example, power presses in which a reciprocator or head reciprocates in one direction, from a starting position, to perform a pressing operation on work pieces, and is then reciprocated back in the other direction to the starting position to complete the cycle; and the invention relates particularly to electrical control systems for controlling the power supplied to the machine to control the operation thereof, and to insure against abnormal operation such as unintended starting of the machine or unintended continued or repeat operation thereof, whereby the machine or the work might be damaged, or workmen at the machine might be injured.

Such control systems have heretofore been proposed in which the power for the machine is supplied by a continuously rotating electrical motor; a clutch being provided to transmit the motor power to the machine to start and operate it; and a brake being provided to stop the machine. In such prior systems the brake and clutch are caused to operate by power (for example, by pneumatic power), under the control of an electro-magnetic device (for example, an electro-magnetic air valve); and to control the electro-magnetic device or valve, to cause the machine to start, and run, and stop, only as intended, an electrical system comprising electro-magnetic contactors, and a plurality of operators' push buttons, preferably a pair for each operator, are provided.

It is one of the disadvantages of prior systems of this class that energization and de-energization of the electro-magnetic clutch and brake controlling device or valve is effected through the contacts of a magnetic contactor which in turn is energized through the operators' push-buttons; the control system being arranged so that upon closure of the operators' push-buttons, the magnetic contactor will close and start the machine, and so that if one of the push-buttons is opened by an operator, the magnetic contactor will open, and stop the machine.

But in practice the contacts of the magnetic contactor sometimes accidentally stick or freeze closed, so that when an operator opens a push-button expecting the machine to stop, it accidentally continues to run, with consequent danger of damage to the machine or to the work, or injury to the workmen attending it.

The necessity of using a magnetic contactor for this purpose results in general from the fact that the electro-magnetic device or valve commonly employed takes an initial energization current of the order of 20 ampheres (at the usual 110 volts of the supply mains) to energize it, and current of this value is too great to be practicably initiated by the simple small-sized operators' push-buttons that it is desirable and customary to employ.

In the present invention, the circuit to energize the electro-magnetic device or valve to start the machine is initially made by a magnetic contactor, but the control is then automatically transferred directly to the operators' push-buttons. If thereafter a push-button is opened with the intention of stopping the press, it breaks the current to the device or valve directly on the push-button so that the danger above mentioned is removed. I have found that while the push-buttons, as commonly employed, cannot safely and practicably initiate the large energizing current of the device or valve, they can carry it or break it after it has been initiated by the magnetic contactor, because inasmuch as the current employed is usually alternating current, the inductive effect of the electro-magnetic device after it operates reduces this current to a small value, say of the order of 5 amperes, and this amount of current can be practicably carried or broken at the push-buttons.

Thus even if the magnetic contactor which initiates the current to the electro-magnetic device or valve should stick closed, the device or valve is nevertheless de-energized to stop the press directly by the push-buttons, upon releasing one or more of them, so that the dangers above mentioned are obviated.

Besides the above described improvement over prior systems of this class, my invention embodies other improvements which will become apparent hereinafter, among which are that the entire system may be operated by current at one voltage, and that a relatively small voltage, such as 110 volts, and that the machine will automatically stop at the end of its cycle even if the operators maintain the push-buttons in the closed position to which they were moved to initiate operation of the cycle; etc., etc.

The present invention has perhaps its most important application to power operated presses of the vertically reciprocatory type and will therefore be illustrated and described herein as applied to such a power press, although as will become apparent hereinafter, my invention is not limited in its application to presses but may be applied generally to machinery which has a cycle of operations.

It is among the objects of this invention:

To provide generally an improved control system for cyclically operating machines to insure that the machines will not accidentally start or accidentally continue to run when not intended;

To provide a control system for cyclically operating machines of the type in which power to start the machine is controlled by a plurality of operators' push-buttons, and having improved means for causing the machine to positively stop upon release of any one of the push-buttons;

To provide in a control system for cyclically operating machines of the type employing an electro-magnetic device to control a clutch and brake for the machine, improved means whereby energization of the device to start the machine is effected by a magnetic contactor upon closing operators' push-buttons and whereby de-energization of the device to stop the machine, is effected directly by any push-button upon releasing it;

To provide in a control system for cyclically operating machines of the type in which the control of power to drive the machine is effected by an electro-magnetic device upon closing operators' push-buttons, improved means whereby the device may be de-energized to stop the machine directly by release of a push-button;

To provide a control system for a machine of the cyclically operating type by which, among other features, the machine may be started only after all of a plurality of operators' push-buttons are closed; and will stop if any push-button is released, and unless the push-buttons are held closed for a predetermined part of the operating cycle of the machine; and which will auto­matically stop at the end of the cycle; and in which the portion of the operating cycle, through which the push-buttons must be held closed, may be adjustably varied in an approved manner; and in which the machine will stop automatically at the end of its cycle in the event of voltage failure or in the event that the push buttons are held operated and not released at all; and which cannot be started to begin a cycle unless all of the push-buttons have first been released;

To provide generally an electric control system for machines of the cyclically operating type, having improved means for insuring safety of operation thereof by preventing accidental operation thereof with consequent liability of damage to the machine or to the work, or to workmen who may be operating the same.

To provide a control system of the type referred to above in which only two electro-magnetic contactors are required to effect prevention of starting of the machine except when all of the operators' push buttons have been released, and, to effect breaking of the energizing current of the device or valve directly on the push buttons.

Other objects will be apparent to those skilled in the art to which my invention appertains.

My invention is fully disclosed in the following description taken in connection with the accompanying drawings in which.

Figure 1:
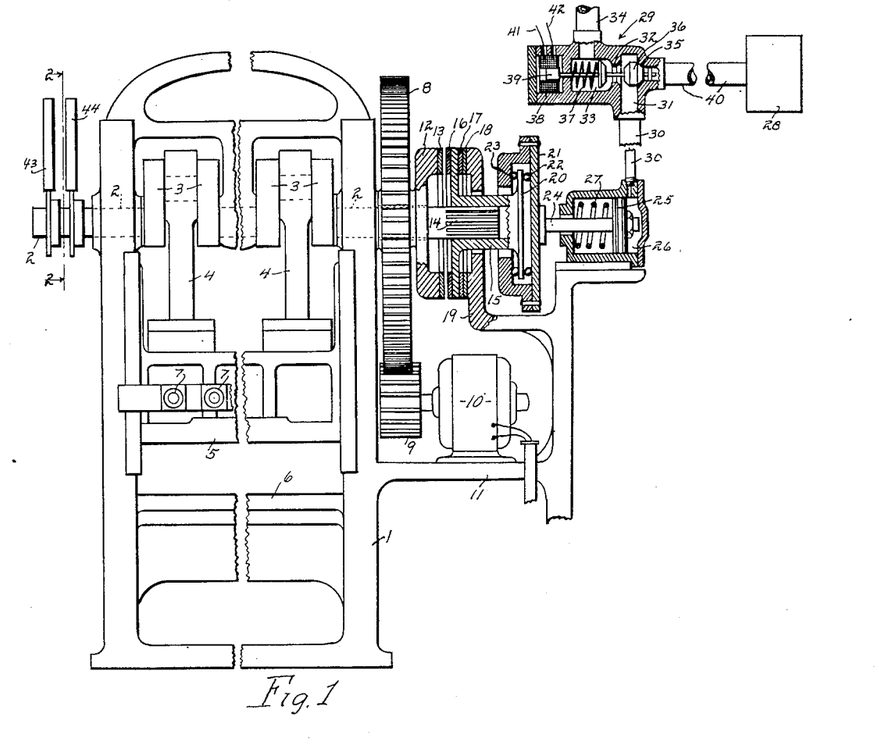
Fig. 1 is a front elevational view, in some respects diagrammatic, of a power operated press to the control of which my invention is particularly applicable and illustrating in connection therewith a clutch and a brake and an electro-magnetically operable valve device for controlling fluid pressure to operate the same, and illustrating diagrammatically a number of limit switch operated by movement of the main shaft of the press.
Figure 2:
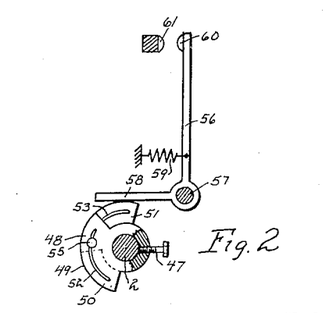
Fig. 2 is a view taken in general from the plane 2—2 of Fig. 1 and illustrating in side elevation and somewhat diagrammatically one of the limit switches of Fig. 1 with means for adjusting the operation thereof.

Referring to the drawings, Figs. 1 and 2, I have shown generally at 1 the main base of a power operated press, having a crank shaft 2, and a pair of cranks 3—3, which operate connecting rods 4—4, to reciprocate an upper head 5, toward and from a lower stationary head 6, to perform pressing operations upon work pieces placed in dies or the like, not shown, but to be as usual mounted on the heads 5 and 6.

A revolution of the shaft 2, and a complete alternate reciprocation of the head 5, constitutes a cycle of operations of the machine, and the parts are illustrated in Fig. 1 at the beginning of the cycle.

Mounted adjacent to the machine or on it, is a plurality of operators' push-buttons 7—7. Preferably two push-buttons are provided for each operator of the machine, although only two have been shown; and the control system to be described is arranged so that all of the operators' push-buttons must be closed before the head 5 will start downwardly, whereby the operator's hands and arms and other parts of his body will be out of the line of movement of the head 5 and therefore out of danger of injury thereby, and to this end the push-buttons 7—7 may be disposed at some distance from the head 5.

A gear 8 is mounted to run idly upon the shaft 2, and is meshed with a motor pinion 9 on the shaft of a motor 10 supported on the frame 1, or on a bracket 11 thereof, and, in the operation of the machine, the motor 10 runs continuously at a predetermined speed and continuously rotates the gear 8.

A clutch head 12 is secured to and rotates with the gear 8 and has an annular clutch ring 13 thereon.

The end of the shaft 2 projects outwardly through and beyond the gear 8 and clutch head 12, and is splined as shown at 14, and meshed with the splines 14 is the hub 15 of an actuator, having a clutch ring 16 normally spaced from the clutch ring 13, and having a brake ring 17 normally engaged with a brake ring 18 mounted on a bracket 19 on the machine frame.

The actuator has a ball race in the form of a disc 20 within a housing 21, in which are mounted ball bearings 22 and 23 on both sides of the disc 20; and the housing 21 is connected to the piston rod 24 of a piston 25, reciprocable in a cylinder 26; and the piston 25 is normally held toward the right, as viewed in the drawings, by a spring 27;

and the thrust of the spring is transmitted to the piston rod 24 and housing 21, and through the ball bearing 23, to the disc 20, and thence to the hub 15, and thereby holds the brake ring 17 in engagement with the brake ring 18, and, acting through the splines 14, exerts a braking action on the shaft 2, to hold it from rotation or to stop it if it is rotating.

When the piston 25 is reciprocated toward the left as viewed in the drawings, against the tension of the spring 27, the hub 15 is moved by the ball bearing 22 toward the left, on the splines 14, and frictionally engages the clutch rings 13 and 16, whereby the rotary movement of the gear 8 is transmitted through this engagement to the splines 14, and to the shaft 2, and the motor 10 then rotates the shaft 2 to operate the press.

The piston 25 is operated by air pressure from a source 28, controlled by a valve device 29. In the normal position of the parts illustrated, the cylinder 26 is exhausted through a conduit 30 to a chamber 31, through a valve port 32 to a chamber 33, and out to atmosphere at 34, and air pressure from the source 28 is cut off at a port 35, by a valve 36, held in port-closing position by a spring 37.

An electro-magnetic winding 38 is provided which, when energized, moves a plunger 39 to compress the spring 37 and retract the valve 36 to uncover the port 35 and close the port 32, whereupon fluid pressure from the source 28 flows by a conduit 40 through the port 35 to the chamber 31, and by conduit 30 to the cylinder 26, to move the piston against the tension of the spring 27 for the purposes described.

From the foregoing description it will now be apparent that when the electro-magnetic winding 38 of the valve device 29 is energized, the brake of the machine is released and the clutch is set, by air pressure in the cylinder 26; and that when the winding 38 is de-energized, the clutch is released and the brake is set to stop the machine, by the spring 27; and that energization of the winding 38 may be effected by an electric circuit comprising wires 41 and 42.

The left-hand end of the shaft 2, as viewed in Fig. 1, extends beyond the machine and has mounted thereon a plurality of cam operated limit switches 43—44 inclusive, the operation of which may be seen from the diagrammatic elevational view of one of them in Fig. 2. Any desired number of such limit switches may be employed, two being shown. Upon the shaft 2, Fig. 2, is mounted by means of a screw 47, a cam 48, having a cam surface 49, preferably in two overlapping parts, a front part 50 and a rear part 51, having arcuate slots 52 and 53 therein respectively, through which a clamp bolt 55 is projected to lock them together. The part 50 is clamped upon the shaft 2 by the screw 47 but may be adjustably positioned around the shaft by loosening the screw 47 and shifting the part 50 and again tightening the screw 47, and the part 51 may be shifted around the shaft 2 and then secured to the part 50 by the bolt 55, whereby the extent of the cam surface 49 may be adjustably varied as well as its angular position around the shaft 2.

A contactor arm 56 is pivotally supported at 57, and has a finger 58 engaged with the cam surface 49, by a spring 59, and the arm 56 carries a movable contact 60 opposite a stationary contact 61.

As will be apparent from this diagrammatic construction, when the shaft 2 is rotated, the cam surface 49 will leave the finger 58 and the spring 59 will close the contacts 60 and 61, and as the shaft 2 continues to rotate the finger 58 will ride up on the cam surface 49 and disengage the contacts 60 and 61.

Obviously the cam switch of Fig. 2 may, when the shaft 2 is at the beginning of its cycle, be positioned either to cause the contacts 60 and 61 to be engaged or dis-engaged.

Figures 3, 4, 11:
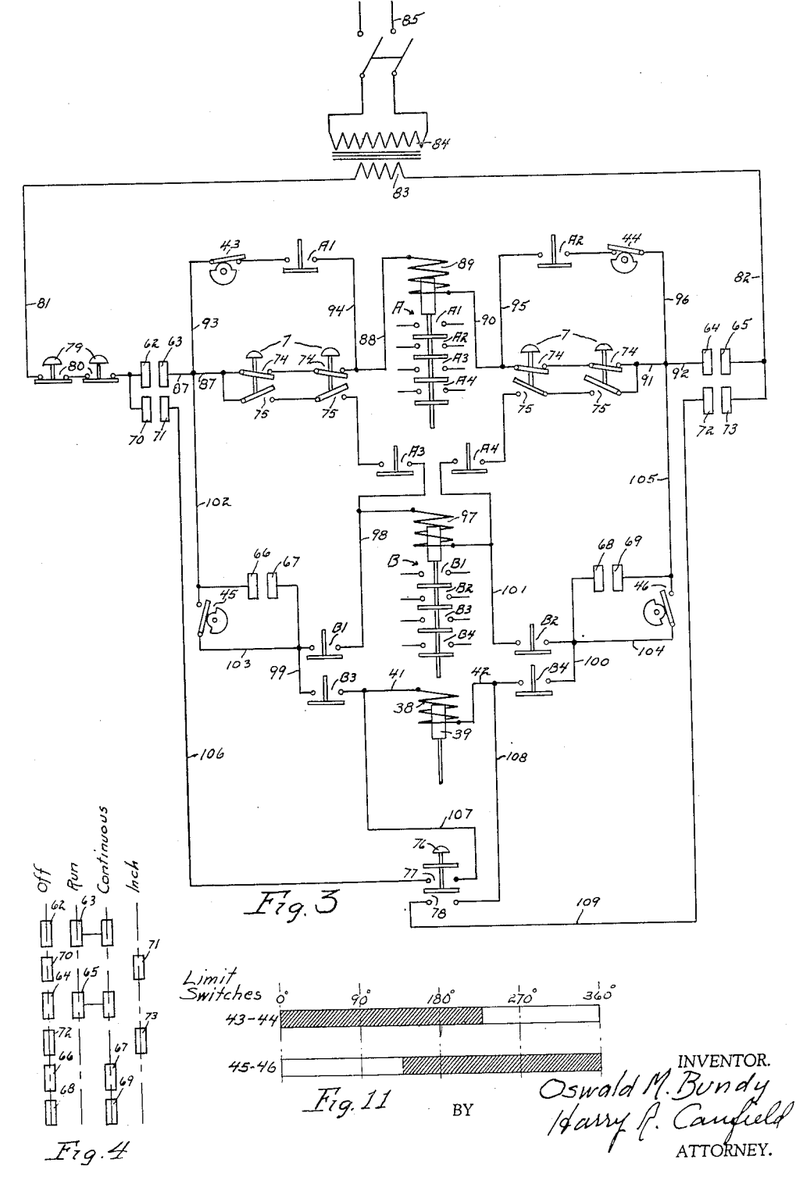
Fig. 3 is a diagrammatic view illustrating the preferred control system for the machine of Fig. 1 embodying my invention.
Fig. 4 is a diagrammatic view of a master controller or selector which may be used with the system of Fig. 3.
Fig. 11 is a diagrammatic view illustrating the timed sequence of operation of limit switches of Fig. 3.

Referring now to Figs. 3 and 4, which illustrate the control system embodying my invention in its preferred form, four of these cam operated limit switches 43—44 and 45—46 have been reproduced diagrammatically, the switches 43 and 44 being normally closed and the switches 45 and 46 normally open; and in this figure is reproduced the valve winding 38 and its plunger 39, and the circuit wires 41 and 42 thereof, as well as the push-buttons 7—7.

Besides the parts referred to, there is in Fig. 3, a magnetic contactor shown generally at A having four sets of contacts, A1, A2, A3, and A4, which contacts, to simplify the circuits of the system, are reproduced elsewhere therein, and there is a magnetic contactor B having four sets of contacts, B1 to B4 inclusive, which likewise are reproduced elsewhere in the circuit.

The master controller or selector of Fig. 4, when operated as will be described, closes pairs of contacts, and these pairs of contacts are reproduced in the diagram, Fig. 3, at 62—63, 64—65, 66—67, 68—69, 70—71 and 72—73, and have therein the same reference characters as in Fig. 4.

The operators' push-buttons 7—7—7—7 each control normally closed contacts 74 and normally open contacts 75. An "inch" push-button 76 controls a pair of normally open contacts 77—78; and one or more stop push-buttons 79 control contacts 80.

Current to operate the control system is supplied to mains 81 and 82 by the secondary 83 of a transformer having a primary 84 which may be connected to a line 85, the voltage of the mains 81 and 82 preferably being of the order of 110 volts.

The various connections in the system will now be described in connection with a description of its operation as a whole.

The master controller or selector, Fig. 4, is provided to predetermine whether the system is to be operative or not; and whether the press is to run a single cycle and then stop; or whether it is to run continuously cycle after cycle after being once started, until stopped; or whether it is to be "inched" ahead by small increments of movement, such as are necessary when the dies on the heads 5 and 6 of the machine are being adjusted; and these positions are designated in Fig. 4, by the legends "Off," "Run," "Continuous" and "Inch," and the controller being illustrated in the "Off" position.

Assuming that it be desired to operate the machine to "run" by single cycles, the controller of Fig. 4 is moved to engage the contacts of the "Off" position with those of the "Run" position, thereby connecting contacts 62—63 and contacts 64—65.

Current thereupon flows from the main 81 through the stop button contacts 80, contacts 62—63, by wire 87 through the upper closed contacts 74 of two of the operators' push-buttons 7—7, and thence by wire 88, through the winding 89 of the contactor A, by wire 90, through the upper closed contacts 74 of the other pair of push-buttons 7—7, by wires 91 and 92, through the contacts 64—65, to the main 82.

Contactor A is thereby operated, closing its contacts A1 to A4. A maintaining circuit is thereby made for the contactor A from the wire 87, by wire 93, closed limit switch 43, now closed contacts A1, and wire 94, bridging the first pair of push buttons 7—7, and by wire 95, now closed contacts A2, and closed limit switch 44, and wire 96, bridging the other pair of push buttons 7—7 so that the contactor A will remain operated when the push-buttons 7—7 are presently depressed to open the contacts 74.

To start the press the push-buttons 7—7 are depressed opening contacts 74 and closing contacts 75, and thereupon the winding 97 of the contactor B is energized, the current flowing as before to wire 87, thence through the contacts 75, through now closed contacts A3, through the winding 97, and through now closed contacts A4, and through the contacts 75 of the other pair of push-buttons 7—7 and by wire 91, and so on, closing the contacts B1 to B4 of contactor B.

The closure of these contacts energizes the winding 38 of the magnetic valve above described, the current flowing from wire 87 through the contacts 75 of the first pair of push-buttons, contacts A3, by wire 98, closed contacts B1, by wire 99, closed contacts B3, by wire 41, through the winding 38, by wire 42, through closed contacts B4, by wire 100, through closed contacts B2, by wire 101, through closed contacts A4, through the closed contacts 75 of the other pair of push-buttons 7—7, and by wire 91, and so on.

The winding 38 being energized the press starts as described.

It will be observed that the contacts 75 of the push-buttons 7—7 when closed did not directly energize the winding 38 but first closed the contactor B, and that the winding 38 was energized when contacts B1 to B4 closed, so that these contacts initiate the energization of the winding 38; but that the current to the winding 38 flows through the push-button contacts 75, although it is initiated therethrough after they have been closed. If now, any one of the operators, for any reason, wants to stop the press, or if he should inadvertently release his push-button and then move his hand or arm into a position of danger as referred to, the contacts 75 of his push-button will open and this will directly break the current to the winding 38, de-energizing it and stopping the press.

Of course, opening any push-button contact 75 de-energizes the contactor B and it opens, but de-energization of the valve-winding 38 being effected directly by the opening of the contact 75, is not dependent upon opening of the contactor B.

This is one of the particular advantages of my invention. The contactor B initiates, on its contacts, the circuit to the winding 38, and the relatively great current at this moment flows through the push-button contacts 75 which are already closed. Thereafter, the flowing current decreases, due to the drawing of the plunger 39 into the winding (see Fig. 1), and due to the consequent increase of the inductive effect of the winding 38, and this current can be safely broken at the contacts 75 of the push-buttons; and if any one of them is released, the winding 38 will be de-energized even if the contacts of the contactor B should stick closed, as sometimes occurs in practice. It is thus made possible for any operator at any push-button to stop the press instantly if he releases a button, by breaking the current to the valve winding 38 directly on the contacts of the push-button.

After the press head 5 has moved downwardly sufficiently far after the initiation of the cycle, it is desirable to have the control of the winding 38 taken over from the operators' push-buttons 7—7, because by that time there is no liability that an operator may want to stop the press by his push-button, and also by that time the head 5 has moved down so far that there is no danger that the workmen will get in its path and be injured; and it is desirable then furthermore to relieve the operators from holding the push-buttons closed, so that they may get ready to remove the finished work from the press.

To take over the control, the limit switches 45 and 46 are provided and are adjusted (as described above in connection with Fig. 2) to close at the said predetermined point in the cycle. Thereupon current flows to the winding 38 from the wire 87, by a wire 102, through the limit switch 45, and through a wire 103 and there the current divides, part going through contacts B1, by wire 98, through the winding 97 of the contactor B, by wire 101, contacts B2, by wire 104, through the other limit switch 46, and by wire 105, and so on, thus maintaining the contactor B closed; and the other branch of the current flowing by the wire 99, contacts B3, winding 38, contacts B4, wire 100, wire 104, and through the limit switch 46, and so on; thus maintaining both the contactor B and the winding 38 energized; and the press continues its cycle, completing the down stroke, and starting back toward the origin of the cycle, that is, raising the head 5.

The limit switches 45 and 46 are adjusted so that they will open at or near the top of the stroke or beginning of the machine's cycle, and when they open they break the described circuit directly on their contacts and de-energize the contactor B, restoring its contacts B1 to B4, and thereby de-energizing the winding 38, and the machine is stopped by the brake as described above.

At a suitable time after the limit switches 45 and 46 close, the limit switches 43 and 44 open, being adjusted to this end as described, and when they open they, of course, de-energize the winding 89 of the contactor A and it restores, opening the contacts A1 and A2 of the maintaining circuit and the switches 43 and 44 are adjusted so that by the time the press reaches the end of its cycle and stops, they will again have closed.

This arrangement is provided as an additional safety or "anti-repeat" feature. The operators, through carelessness or inefficiency, may hold the push-buttons 7—7 depressed throughout the entire cycle, so that in the absence of provision to the contrary, the press would start on another cycle as soon as it reached the end of the first cycle; but with the arrangement under consideration, if the push-buttons 7—7 are held depressed or if any one of them is held downwardly, then when the limit switches 43 and 44 effect opening of the contactor and its contacts, including A3 and A4, the contactor B cannot be closed again, and hence the valve winding 38 cannot be energized again. It is made necessary therefore for all of the operators to completely release their push-buttons before another cycle can be initiated, this feature being suitably described as an "anti-repeat" safety feature. When they are released, the contactor A can again be closed through the contacts 74 of the push-buttons 7—7 and another cycle initiated.

Thus on the "Run" position of the controller, Fig. 4, all the push-buttons 7—7 must be depressed to energize the valve winding 38 and start the press cycle; and they must be held down through a predetermined part of the cycle, for safety; and if any one of them is released, the press is instantly stopped by de-energization of the valve winding 38, directly on the contacts of the push-button; and after the cycle has proceeded until danger has passed, the push-buttons may be either released or held down; if they are held down to the end of the cycle, the press will stop; if they are released the apparatus is thereby put in condition for the initiation of another cycle upon depressing them; if they are not released they must be released before another cycle can be initiated; and in each instance of operation of the push-buttons, all of them must be operated to start the cycle, and releasing any one of them will stop the press unless the limit switch has in the meantime taken over its control, and all of them must be released before another cycle can be initiated.

Furthermore, it will be observed that in Fig. 3, the push-buttons 7—7 are in two groups, one group on either side of the winding 89 of the contactor A, and that the current tot he valve winding 38 and to the windings 97 and 89 of the contactors B and A are opened at both sides thereof. By this arrangement, protection against starting by accidental grounds is provided as set forth in the patent to J. J. Mellon, No. Re-21,017, for Power control for machine tools.

If it be desired that the press shall continue to operate and repeat its cycle after once being started, the master controller or selector, Fig. 4, is moved to engage the contacts of the "Off" position with those of the "Continuous" position, which closes contacts 62—63, 64—65, 66—67, and 68—69. Now when the push-buttons 7—7 have all been closed, to effect closing of the contacts of contactor B, as described above, current flows from main 81, through the stop-buttons 79, through contacts 62—63, by wire 87, by wire 102, through the contacts 66—67, through contacts B1 and B3, through the winding 97 and the winding 38, through the contacts B2 and B4, and thence through contacts 68—69, and by wire 105, to wire 92 and through the contacts 64—65 to the main 82, continuously maintaining the press in operation. To stop the press, one of any plurality of push-buttons 79 may be depressed to open this described circuit which will de-energize the contactor B, and cause it to open, and de-energize the winding 38.

There are times when it is desirable to "inch" the press, for example when setting up the dies therein, and to this end, the master controller or selector of Fig. 4, is operated to move the contacts of the "Off" position into engagement with the corresponding ones of the "Inch" position, and in Fig. 3, this closes contacts 70—71 and 72—73. To start or stop the press, the "Inch" button 76 is depressed or released respectively. When it is depressed, current flows from the main 81 through stop switches 79, through the contacts 70—71, by wire 106 through the "Inch" button contacts 77, by wires 107 and 41, through the valve winding 38, by wire 42, by a wire 108, through the "Inch" button contacts 78, by wire 109, to and through contacts 72—73, to the main 82, thereby energizing the winding 38. The "Inch" push-button 76 is preferably a double contact button, as shown. Upon releasing the push-button 76, of course, the winding 38 is de-energized and the press stops, or it could be stopped if desired by depressing one of the stop buttons 79. Here again the current to the winding 38 is broken directly on the contacts of the push button 76, whereby safety is introduced as in the case of the push buttons 7 as described hereinbefore.

It will be noted that in either the "Continuous," or the "Inch" conditions, the limit switches have no effect upon the controls.

In the control system of Fig. 3, as has been explained, the length of time or the part of the cycle during which the operators' push-buttons 7—7 must be maintained depressed until the limit switches 45 and 46 take over the control, may be adjusted at the limit switches themselves, as described in connection with Fig. 2. In Fig. 11 is illustrated diagrammatically a suitable adjustment for these limit switches and also for the limit switches 43 and 44; the shaded areas indicating the closed condition of these switches plotted against degrees of the cycle of operations, or rotational positions of the main shaft 2.

Figures 9, 10, 12:
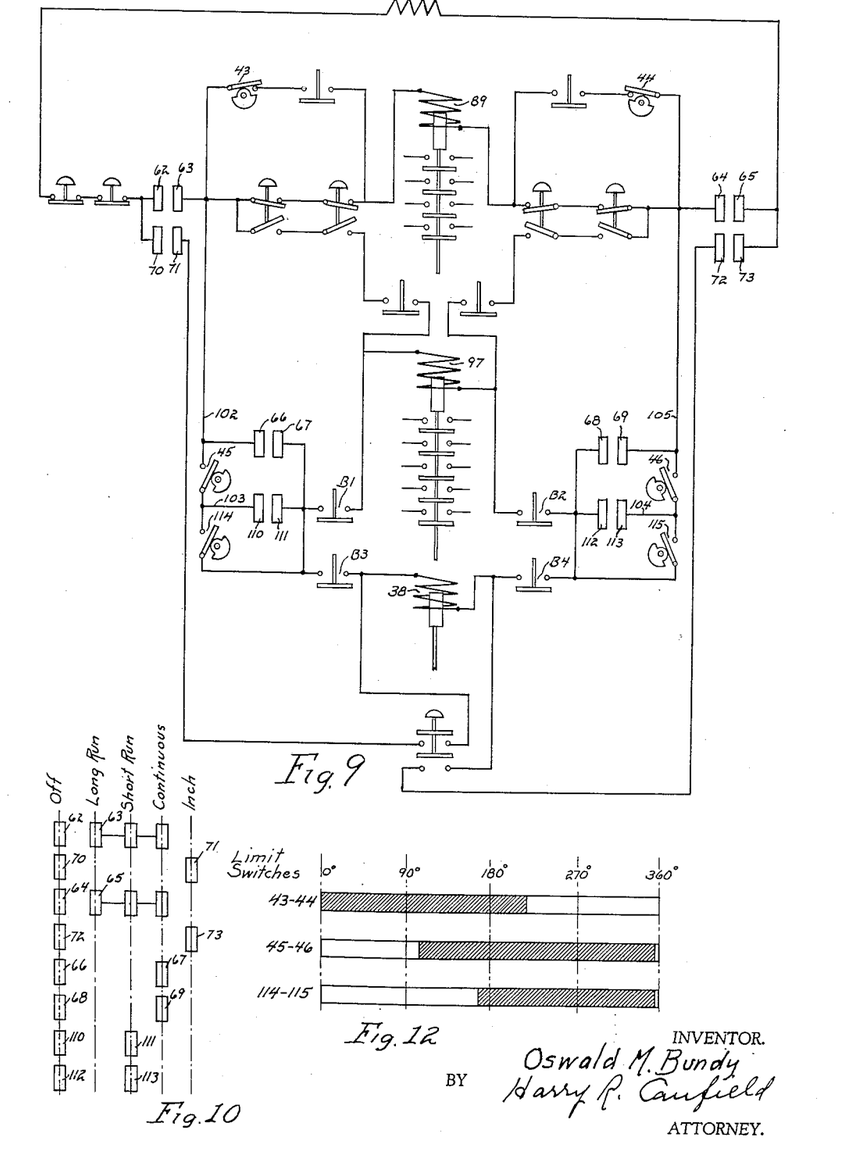
Fig. 9 is a view similar to Fig. 3 illustrating a modification thereof which may be employed.
Fig. 10 is a view similar to Fig. 4 but corresponding to the system of Fig. 9.
Fig. 12 is a view similar to Fig. 11 but with reference to Fig. 9.

In some cases, however, as conditions warrant it may be desirable to change the system to make this part of the cycle long or short. That is to say, in some cases it may be desirable to require the operators to hold the push-button 7—7 depressed for a long part of the down stroke of the press and in other cases for a short time. In Figs. 9 and 10, is shown a modification of Figs. 3 and 4, wherein this change is provided for on the master selector or controller.

The master controller, Fig. 10, has an added "Long run" position, and on this controller the "Short run" position corresponds to the "Run" position of Fig. 4.

The diagram of Fig. 9 is the same as Fig. 3, except that in the line of the wires 103 and 104 of that figure, pairs of controller contacts 110—111 and 112—113 have been added respectively; and another pair of limit switches, 114—115 have been added. The limit switches 114—115 are designed or adjusted to close later than the limit switches 45 and 46.

When it is desired that the safe part of the cycle shall be short, the controller, Fig. 10, is moved to engage the "Off" contacts with the "Short run" contacts, closing contacts 110—111 and 112—113 in addition to those described for Fig. 3; the operation is then the same as described for Fig. 3. The limit switches 45 and 46 will, in this case, be designed or adjusted to close and take over the control after a relatively short movement of the press.

When it is desired that the safe movement of the press shall be relatively long, the controller of Fig. 10 is moved to the "Long run" position. In this position the contacts 110—111 and 112—113 are open and the current from the wire 102 flowing to the windings 97 and 38 flows through both pairs of limit switches in series, 45 and 114 in one case and 115 and 46 in the other case. The limit switches 45 and 46 close as before after a relatively short movement, but no change is thereby made. When the limit switches 114 and 115 close, later, they take over the control from the push-buttons as hereinbefore described in connection with Fig. 3. A suitable timing of the closing and opening of the limit switches 43 and 44, 45 and 46, 114 and 115 of this system is illustrated in Fig. 12.

Figures 5, 7:
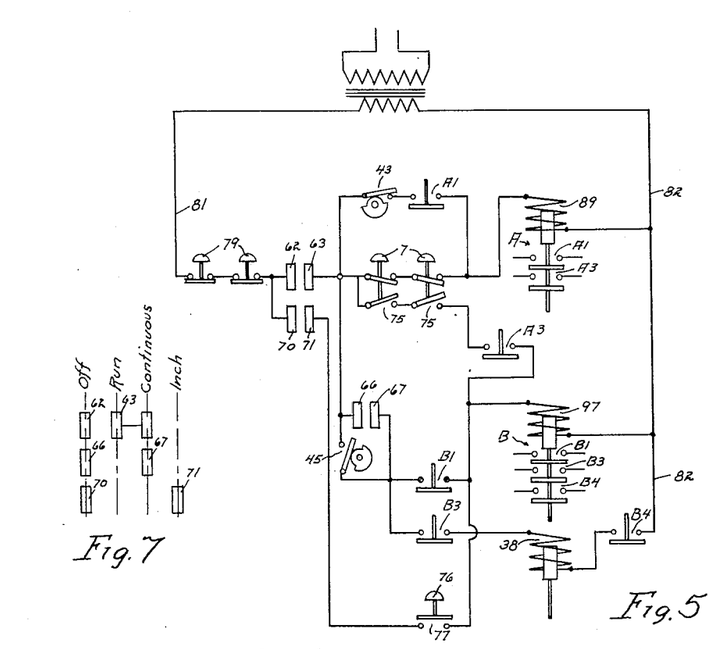
Figs. 5 and 6 are views similar to Fig. 3, illustrating modifications of the system of Fig. 3 which may be employed, the same being in the nature of simplifications thereof at the expense of certain advantages thereof.
Figs. 7 and 8 are respectively views similar to Fig. 4 but corresponding respectively to the diagrammatic systems of Figs. 5 and 6.

In Figs. 5 and 7 is illustrated a modification of the system of Fig. 3 which may be used when simplicity and cheapness are essential and the full protection of the system of Fig. 3 is not necessary. Only one set of push-buttons 7—7 is employed, and only one limit switch 43 in the maintaining circuit for the winding 89, and only one limit switch 45 to take over the control from the push-buttons; and the contactors A and B are correspondingly simpler in that they have fewer contacts; and the controller of Fig. 7 is correspondingly simpler inasmuch as only the contacts 62—63, 70—71 and 66—67 are employed. The difference between this system and that of Fig. 3 is that the circuits through the windings of the contactors A and B are broken only with respect to one supply line, the line 81, these windings being connected directly with the other supply line 82. The valve winding 38 however, has its circuit broken at both sides by the contacts B3 and B4, as in Fig. 3. The initiation of energization of the winding 38, however, is as in Fig. 3, made on the contactor B, but as before, may be broken directly on the push-button switches 75.

Figures 6, 8:
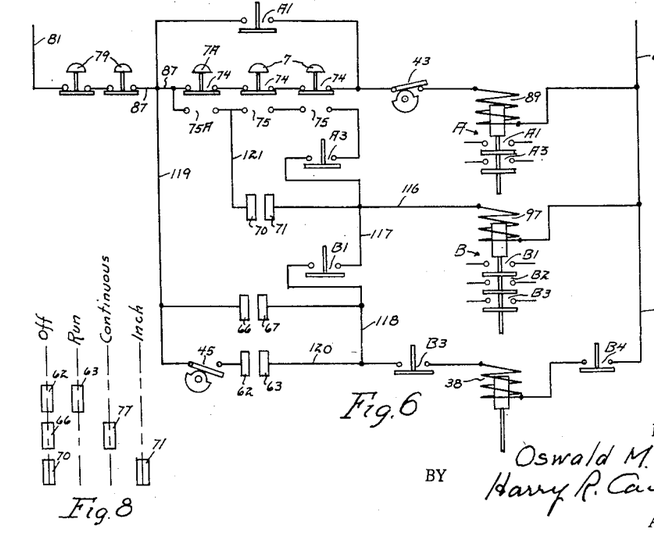

In Figs. 6 and 8 is shown a system similar to Fig. 7 except that the inching control is placed on one of the operators' starting push-buttons and the disposition of contacts on the master control is different.

In this system, assuming that the controller of Fig. 8 has been moved to the "Run" position, current comes from the main 81, through the stop-buttons 79, through the upper contacts 74—74 of a plurality of operators' push-buttons 7—7—7A, and through the limit switch 43 in series with the winding 89 of the contactor A, to line 82, closing this contactor; and the contactor by closing its contacts A1, makes a maintaining circuit for itself around the push-buttons, so that it will stay closed when they are depressed.

When all of the push-buttons have been depressed, the circuit is by wire 87 through the lower contacts 75A and 75—75 of the push-buttons in series, through contacts A3, and by wire 116, to the winding 97 of contactor B, and thence to main 82, closing the contactor B; whereupon current flowing through the contacts A3 divides, part going through the winding 97, and part by wire 117 through contacts B1 which is now closed, and by wire 118, through closed contacts B3, through the winding 38, and through closed contacts B4 to the line 82, starting the press.

If the controller, Fig. 8, has been put in "Continuous" position, current will then flow by wires 87, 119, through the contacts 66—67, and then will divide, part going through contacts B1 and wire 117 and wire 116 to energize the winding 97 and hold the contactor B closed, and part by wire 118, contacts B3, and so on, holding the winding 38 energized continuously, and the press may be stopped by depressing the stop button 79. If, however, the controller has been placed in the "Run" position, the contacts 62—63 will be closed and after the safety part of the cycle has passed the limit switch 45 will close and then the current will flow from wire 87 by wire 119 through the switch 45 through contacts 62—63 and then will divide, part flowing through the contacts B3 to energize the winding 38 and part through wire 118, contacts B1 and wires 117 and 116 to energize the winding 97 and hold these windings energized until the press reaches the top of the stroke and opens the limit switch 45. Thereafter the control cannot repeat because the winding 89 was de-energized by the limit switch 43, the limit switch thereafter again closing and before another operation can be had, all of the push-button switches must be raised again to close the contactor A as before.

In this system, when "inching" is desired, the controller, Fig. 5, is set to the "Inch" position and contacts 70—71 are closed. Now by depressing the push-button 7A current flows from the wire 87 through the contacts 75A of this push-button and by wire 121 through the contacts 70—71 and there divides, part going through the winding 97 to close the contactor B and part by wire 117 and through the contacts B1, and by wire 118 through the contacts B3, winding 38 and contacts B4, to energize the valve winding 38 and start the press, and the press will again stop when the push-button 7A is released to break this energizing circuit.

It will therefore be seen that in each of the modification systems, the results obtained and the advantages thereof are similar to those described more completely for the system of Fig. 3.

The push buttons 7—7 in either of the above described systems may be of the lock type by which they may be locked in the depressed position, such as are described in the patents to Lester H. Colbert, No. 2,133,161, October 11, 1938, for Electric control for power presses and the like, and to T. W. Barlow, No. 2,133,160, October 11, 1938, for Safety electric control contactor, and it is to be understood that the push buttons 7—7 and 76 and 79—79 are provided in practice with means such as springs tending always to return them to the normal positions illustrated.

It will be noted that in each of the systems described above, not only have I achieved a greater degree of safety, as described above, than has heretofore been possible but that this end is attained by the employment of only two magnetic contactors, the contactors A and B.

In prior systems more contactors have been utilized and with a lesser degree of safety.

My invention is not limited to the particular electromagnetically actuable means illustrated and described for controlling the sequential operation of the clutch and brake, inasmuch as the details of the same constitute no essential part of the present invention and other equivalent means may be substituted therefor.

I claim:

1. In a control system for machines of the type comprising means for starting and stopping the machine responsive to energization and de-energization of electro-magnetic means; a source of electric current; a magnetic contactor having a normally open contact; an operator's push-button having a normally open contact; a circuit including the push-button contact and parallel branches, one branch including the winding of the magnetic contactor and the other branch including the said contact of the magnetic contactor and said electro-magnetic means.

2. In a control system for machines of the type comprising means for starting and stopping the machine responsive to energization and de-energization of electro-magnetic means; a source of electric current; a first magnetic contactor having a normally open contact; an operator's push-button having a normally open contact; a second magnetic contactor having an energizing winding and an energizing circuit therefor and having a normally open contact; a circuit including the push-button contact and the contact of the second magnetic contactor in series, and including parallel branches, one branch including the winding of the first magnetic contactor and the other branch including the said contact of the first magnetic contactor and said electro-magnetic means; and a normally closed contact on the push-button in the energizing circuit of the winding of the second magnetic contactor.

3. In a control system of the type comprising means for starting and stopping a machine responsive to energization and de-energization of electro-magnetic means; a machine having a movable element; a source of electric current; a first magnetic contactor having a normally open contact; an operator's push-button having a normally open contact; a second magnetic contactor having an energizing winding and an energizing circuit therefor and having a normally open contact; a circuit including the push-button contact and the contact of the second magnetic contactor in series, and including parallel branches, one branch including the winding of the first magnetic contactor and the other branch including the said contact of the first magnetic contactor and said electro-magnetic means; a normally closed contact on the push-button in the energizing circuit of the winding of the second magnetic contactor; and a maintaining circuit for the winding of the second magnetic contactor, and means to open it operable by movement of the machine movable element at a predetermined position thereof.

4. In a control system for machines of the type comprising means for starting and stopping the machine responsive to energization and de-energization of electro-magnetic means; an operator's push-button having a normally open contact; an energizing circuit including therein in series the contact of the push-button, said electro-magnetic means and a second contact; and electrically actuable means to close the second contact responsive to closure of the push-button contact.

5. In a control system for machines of the type comprising means for starting and stopping the machine responsive to energization and de-energization of electro-magnetic means; a source of electric current; an operator's push-button having a normally closed and a normally open contact; an energizing circuit for said electro-magnetic means open at two points and the circuit including the normally open contact of the push button; electrically energizable means to close the circuit at one said point having an energizing circuit through the normally closed contact of the push-button; and electrically energizable means to close the circuit at the other said point having an energizing circuit through the normally open contact of the push-button.

6. In a control system for machines of the type comprising means for starting and stopping the machine responsive to energization and de-energization of electro-magnetic means; a source of electric current; an operator's push-button having a normally closed and a normally open contact; an energizing circuit for said electro-magnetic means open at two points and the circuit including the normally open contact of the push-button; means to close the circuit at one said point responsive to closure of the normally open contact of the push-button; and means to close the circuit at the other said point responsive to closing of the normally closed contact of the push-button.

7. In a control system of the type comprising means for starting and stopping a machine responsive to energization and de-energization of electro-magnetic means; a machine having a movable element; a source of electric current; an operator's push-button having a normally closed and a normally open contact; an energizing circuit for said electro-magnetic means open at two points and the circuit including the normally open contact of the push-button; a first electrically energizable means to close the circuit at one said point and having an energizing circuit through the normally open contact of the push-button; and a second electrically energizable means to close the circuit at said other point having an energizing circuit through the normally closed contact of the push-button; and a maintaining circuit for the said second electrically energizable means for maintaining it energized independently of the said normally closed contact of the push-button; and means to open the maintaining circuit operable by movement of the machine movable element at a determined position thereof.

8. In a control system for machines of the type comprising means for starting and stopping the machine responsive to energization and de-energization of electro-magnetic means; an operator's push-button having a normally open contact; an energizing circuit for said electro-magnetic means; electrically energizable means to close the circuit; said electrically energizable means having an energizing circuit energizable upon closure of the push-button contact, and the push-button contact being in the energizing circuit of said electro-magnetic means whereby the same may be de-energized directly upon the push-button contact upon opening thereof.

9. In a control system for machines of the type comprising means for starting and stopping the machine responsive to energization and de-energization of electro-magnetic means; an operator's start push-button having a normally open contact; a magnetic contactor having a winding and an energizing circuit therefor through the push-button contact and having a plurality of normally open contacts; and a circuit including a normally closed stop push-button and having parallel branches, one branch including a contact of the contactor and its winding, and the other branch including a contact of the contactor and said electromagnetic means.

10. In a control system for machines of the type comprising means for starting and stopping the machine responsive to energization and de-energization of electro-magnetic means; a machine having a movable element; an operator's push-button having a normally open contact; a magnetic contactor having a winding and an energizing circuit therefor through the push-button contact and having a plurality of normally open contacts; a circuit including a normally open machine operated contactor operable by movement of the movable element and having parallel branches, one branch including a contact of the contactor and its winding, and the other branch including a contact of the contactor and said electro-magnetic means; and means to close the machine operated contactor at a predetermined position of the movable element.

OSWALD M. BUNDY.